(12) United States Patent  
Reitter et al.

(10) Patent No.: US 8,096,320 B2
(45) Date of Patent: Jan. 17, 2012

(54) COMPACT BEVERAGE PRESSURE REGULATOR

(75) Inventors: Klaus Reitter, Tujunga, CA (US); Gerard K. Caldwell, Corona, CA (US); Jon Byrd, West Hills, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 921 days.

(21) Appl. No.: 11/986,674

(22) Filed: Nov. 21, 2007

(65) Prior Publication Data

US 2009/0126799 A1    May 21, 2009

(51) Int. Cl.
    *E03B 1/00*       (2006.01)
(52) U.S. Cl. ...................................... 137/614.2; 251/148
(58) Field of Classification Search .......... 251/148–152; 137/505.25, 614.2
    See application file for complete search history.

(56) References Cited

U.S. PATENT DOCUMENTS

| | | | |
|---|---|---|---|
| 1,799,433 A | 4/1931 | Murphy | |
| 2,322,877 A | 1/1941 | Parker | |
| 2,536,663 A | 1/1951 | Schaer | |
| 2,727,759 A | 12/1955 | Elliott | |
| 2,861,585 A | 11/1958 | Becker | |
| 2,997,059 A | 8/1961 | Mortimer | |
| 3,177,018 A | 4/1965 | Goodwin | |
| 3,601,361 A | 8/1971 | Hundhausen et al. | |
| 4,333,587 A | 6/1982 | Fessler et al. | |
| 4,436,125 A | 3/1984 | Blenkush | |
| 5,056,686 A * | 10/1991 | Jarrett | 222/129.2 |
| 5,263,508 A | 11/1993 | Perrott | |
| 5,492,455 A | 2/1996 | Durham et al. | |
| 5,494,074 A | 2/1996 | Ramacier, Jr. et al. | |
| 5,875,815 A * | 3/1999 | Ungerecht et al. | 137/505.25 |
| 5,988,705 A * | 11/1999 | Norkey | 285/319 |
| 6,026,850 A | 2/2000 | Newton et al. | |
| 6,374,852 B1 | 4/2002 | Olivas | |
| 6,564,614 B1 * | 5/2003 | Doris et al. | 73/49.2 |
| 7,240,693 B2 | 7/2007 | Knop | |
| 2005/0211934 A1* | 9/2005 | Garber et al. | 251/129.01 |
| 2005/0224117 A1* | 10/2005 | Youngberg et al. | 137/505.25 |

* cited by examiner

*Primary Examiner* — John Fristoe, Jr.
*Assistant Examiner* — Marina Tietjen

(57) ABSTRACT

A pressure regulator includes a body member for regulating pressure of a fluid flowing therein. The body member has one end for receiving the fluid and another end for providing pressure regulated fluid. The pressure regulator has two quick-disconnect devices, each arranged on a respective end of the body member, including a male quick-disconnect device for coupling to a corresponding female quick-disconnect device forming part of a hose or dispenser for providing the fluid or a pump for receiving the pressure regulated fluid; or a female quick-disconnect device for coupling to a corresponding male quick-disconnect device forming part of a hose or dispenser for providing the fluid or a pump for receiving the pressure regulated fluid.

12 Claims, 5 Drawing Sheets

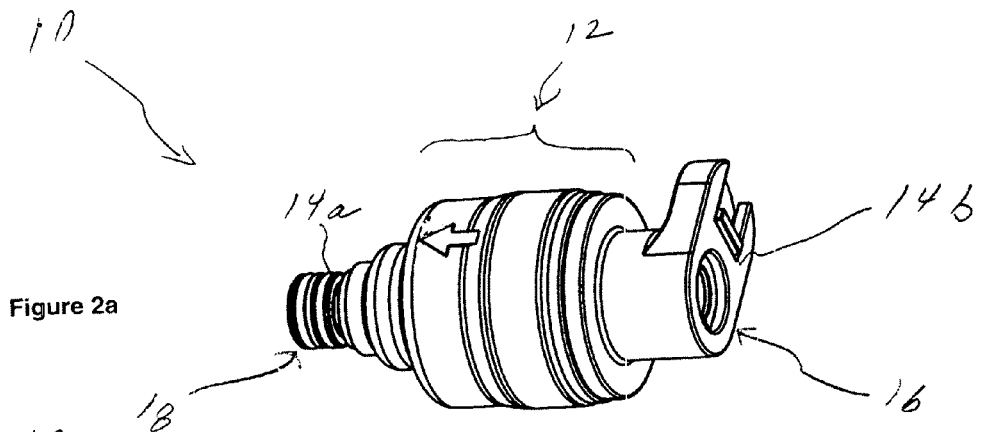
Figure 2a
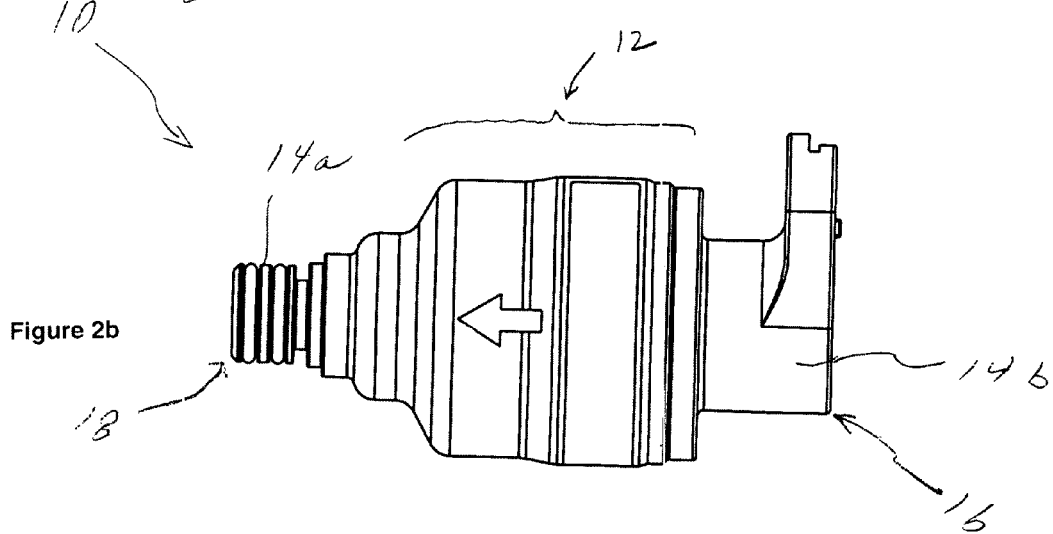
Figure 2b
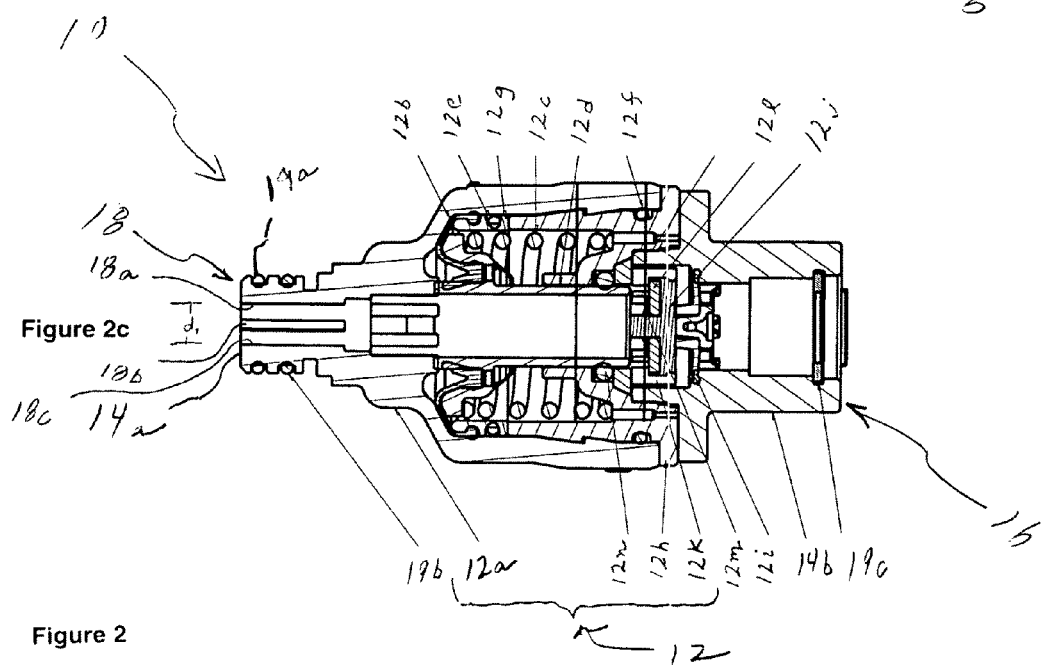
Figure 2c
Figure 2

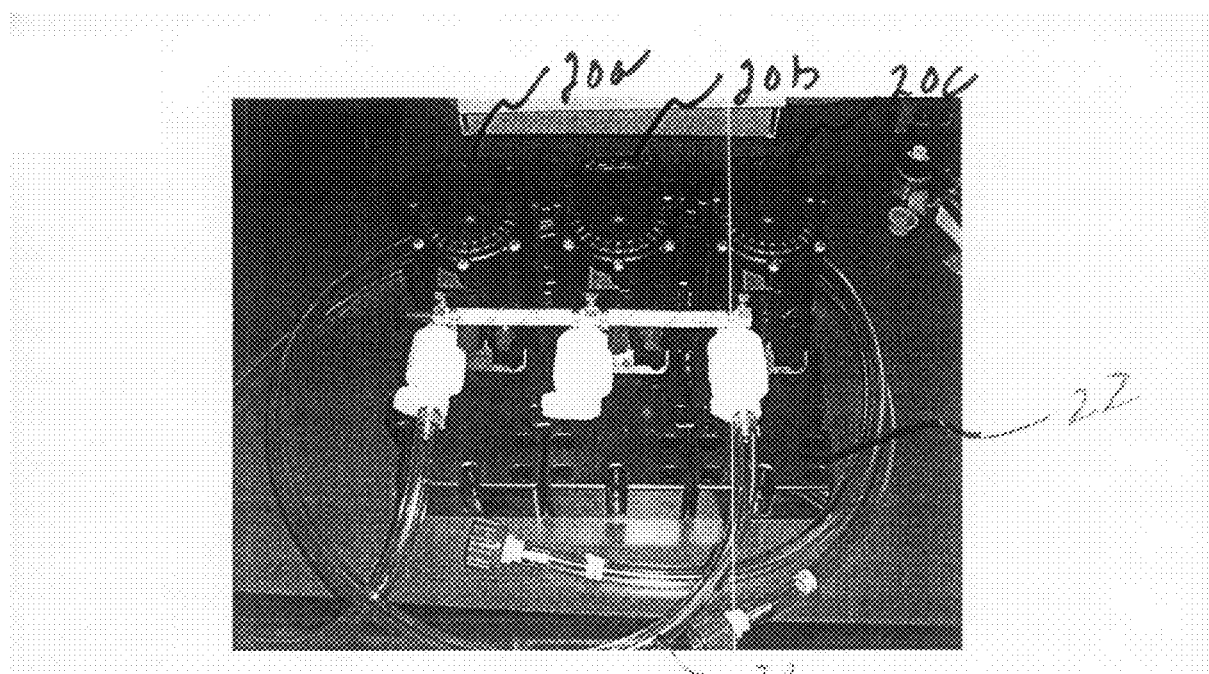
Figure 4a
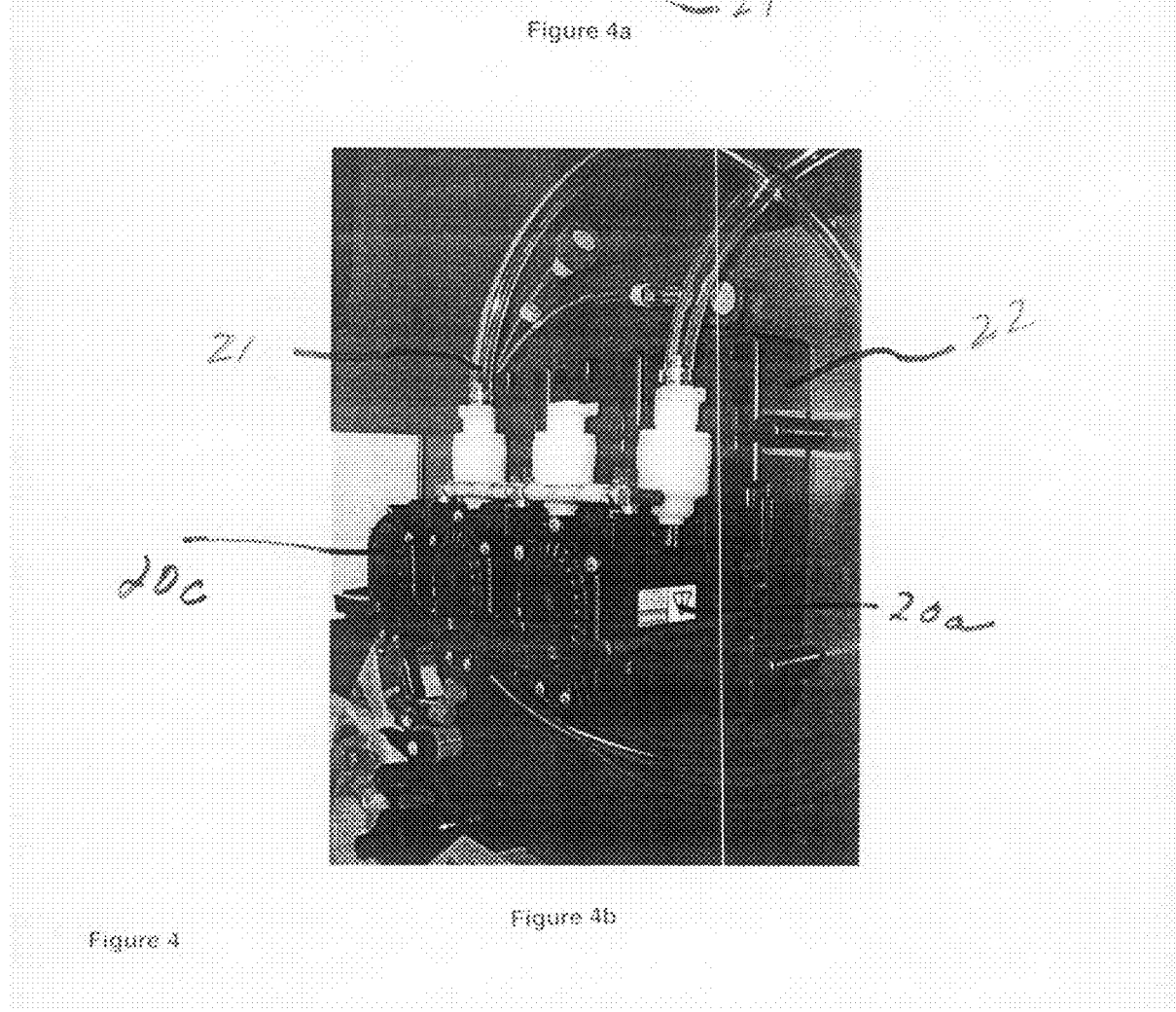
Figure 4b
Figure 4

COMPACT BEVERAGE PRESSURE REGULATOR

BACKGROUND OF THE INVENTION

1. Field of the Invention

The present invention relates to a method and apparatus for regulating the pressure in order to control the flow of a fluid, such as water/syrup.

2. Brief Description of Related Art

There are known pressure regulators that are mainly used to control water or beverage syrup flow in various pressures ranging from 15 PSI to 40 PSI. The devices typically consist of a body member with internal components to control pressure, i.e. springs, rubber membranes, restrictors, Etc. Both ends usually have a hose connection or a hose barb fitting. Water or syrup flow is controlled to the desired flow with a matching internal spring.

For example, FIG. 1 shows one such known pressure regulator having an inner regulator portion and a male end portion on each side. The left end portion as shown has a first fitting welded to the inner regulator portion, a second fitting screwed into the first fitting, and a third hose barb fitting screwed into the second fitting. The third fitting is configured for receiving a hose to adapt to a pump mounted on a mounting plate. The right end portion as shown has a corresponding first fitting screwed to the inner regulator portion, a corresponding second fitting screwed into the corresponding first fitting, and a corresponding hose barb fitting screwed into the corresponding second fitting. The corresponding hose barb fitting is configured for receiving a hose to adapt to a reservoir of water or syrup. This prior art configuration results in very long hose connections that droop, are prone to break, make finding the right connections difficult, result in liquid spills. It is also difficult to keep multiple lines organized and this could cause confusion finding the right connections and a possible health hazard and liquid spills. There may also be increased labor cost in configuring the same.

Other devices known in the art include the following:

U.S. Pat. No. 3,601,361 discloses a hose coupling having a sleeve shaped like a female engaging a male conduit structurally similar for coupling two pieces of a garden hose or the like together.

U.S. Pat. No. 4,819,908 discloses a quick connect fluid coupling having a closed position and an open position based in the insertion of the male part into the female part housing. The male part is engaged in the female part housing by spring metal retainer.

U.S. Pat. No. 5,263,508 discloses a sewer line trap charging valve for use in charging water into sewer line water traps to prevent the escape of gas, having an elongated shaft rotatably and frictionally mounted in a sleeve in working engagement with an annular groove.

U.S. Patent No. 6,026,850 discloses a pressure regulating valve that operates to allow fluid flow if the pressure is maintained at a minimum pressure level, having a modulation device with a diaphragm that modulates the size of the port for allowing fluid flow based on the fluid pressure. In contrast, the pressure regulator being used in conjunction with the present invention set forth herein is configured to prevent fluid pressure from exceeding a certain level.

U.S. Pat. No. 6,374,852 discloses a leak arresting valve that regulates flow between a minimum and maximum flow, having biasing elements for biasing a telescoping poppet between inlet and outlet members to close or partially close a fluid inlet.

In view of this, there is a need in the industry to solve this problem.

SUMMARY OF THE INVENTION

The present invention provides a new and unique pressure regulator featuring a body member for regulating the pressure of a fluid flowing therein, the body member having two ends, one end for receiving the fluid and another end for providing pressure regulated fluid; and a quick-disconnect device arranged on at least one end for coupling the body member to a corresponding quick-disconnect device that forms part of a device that either provides the fluid or receives the pressure regulated fluid.

Other features of the present invention include cone or more of the following: the pressure regulator having two quick-disconnect devices, each quick-disconnect device being arranged on a respective end of the body member; the quick-disconnect device being a male quick-disconnect device for coupling to a corresponding female quick-disconnect device that forms part of either a hose or a dispenser for providing the fluid or a pump for receiving the pressure regulated fluid; the quick-disconnect device being a female quick-disconnect device for coupling to a corresponding male quick-disconnect device that forms part of either a hose or a dispenser for providing the fluid or a pump for receiving the pressure regulated fluid; the pressure regulator being dimensioned so as to allow it to be coupled to a pump arranged on a mounting panel having multiple pumps and fit or stay within the mounting panel and not protrude out; the quick-disconnect device having one or more O-rings; the quick-disconnect device having a locking clip; the pressure regulator controlling water, syrup or beverage flow; or some combination thereof.

The body member may also include a male end having an opening with a multiplicity of inner strengthening ribs circumferentially arranged therein to help prevent the male end from breaking off.

The present invention also includes a method featuring steps of providing such a pressure regulator having such a body member for regulating the pressure of such a fluid flowing therein, the body member having two such ends, one such end for receiving the fluid and another such end for providing pressure regulated fluid, and having at least one such end with such a quick-disconnect device; and coupling the quick-disconnect device to such a corresponding quick-disconnect device of such a pump for providing fluid flow.

The present invention also includes a pressure regulator and pump combination featuring such a pressure regulator having such a body member for regulating the pressure of a fluid flowing therein, the body member having two such ends, one such end for receiving the fluid and another such end for providing pressure regulated fluid, and having at least one such end with such a quick-disconnect device; and such a pump having such a corresponding quick-disconnect device for coupling to the quick-disconnect device of the pressure regulator.

Advantages of the present invention include eliminating the hose connection between the pump and pressure regulator that would otherwise be left to droop, be prone to breaking, make finding the right connections difficult for a mounted panel of such pumps, and result in undesirable liquid spills. The direct connection between the pressure regulator and pump also provides for better pressure regulation because there is less hose, while decreasing labor time when installing the configuration because there is no screwing/unscrewing of various parts, etc., which is being done in the prior art configuration. Moreover, according to some embodiments of the present invention, the new pressure regulator may be shorter by about 4 inches from known devices, which allows the regulator to stay within the known mounting panel and not protrude out, and therefore are much less likely to be broken or damaged. Furthermore, equipping both ends of the new pressure regulator with the quick disconnect devices allows multiple lines to stay organized so there is less likelihood of mistakes. Also, lines can be easily disconnected which will save time for services calls.

BRIEF DESCRIPTION OF THE DRAWING

The drawing includes the following Figures:

FIG. 2 is a diagram of one example of a pressure regulator according to some embodiments of the present invention, including FIG. 2a which shows a perspective view of the pressure regulator, FIG. 2b which shows a side view of the pressure regulator, and FIG. 2c which shows a cross-sectional view of the pressure regulator.

FIG. 4, which includes FIGS. 4a and 4b, shows multiple pressure regulators according to some embodiments of the present invention coupled to multiple pumps.

DETAILED DESCRIPTION OF THE INVENTION

FIG. 2 shows a new and unique pressure regulator generally indicated as 10 featuring a body member 12 and one or more quick-disconnect devices 14a, 14b.

The body member 12 regulates the pressure of a fluid flowing therein, has two ends generally indicated as 16 and 18, one end 16 for receiving the fluid and another end 18 for providing pressure regulated fluid.

Figure 3:
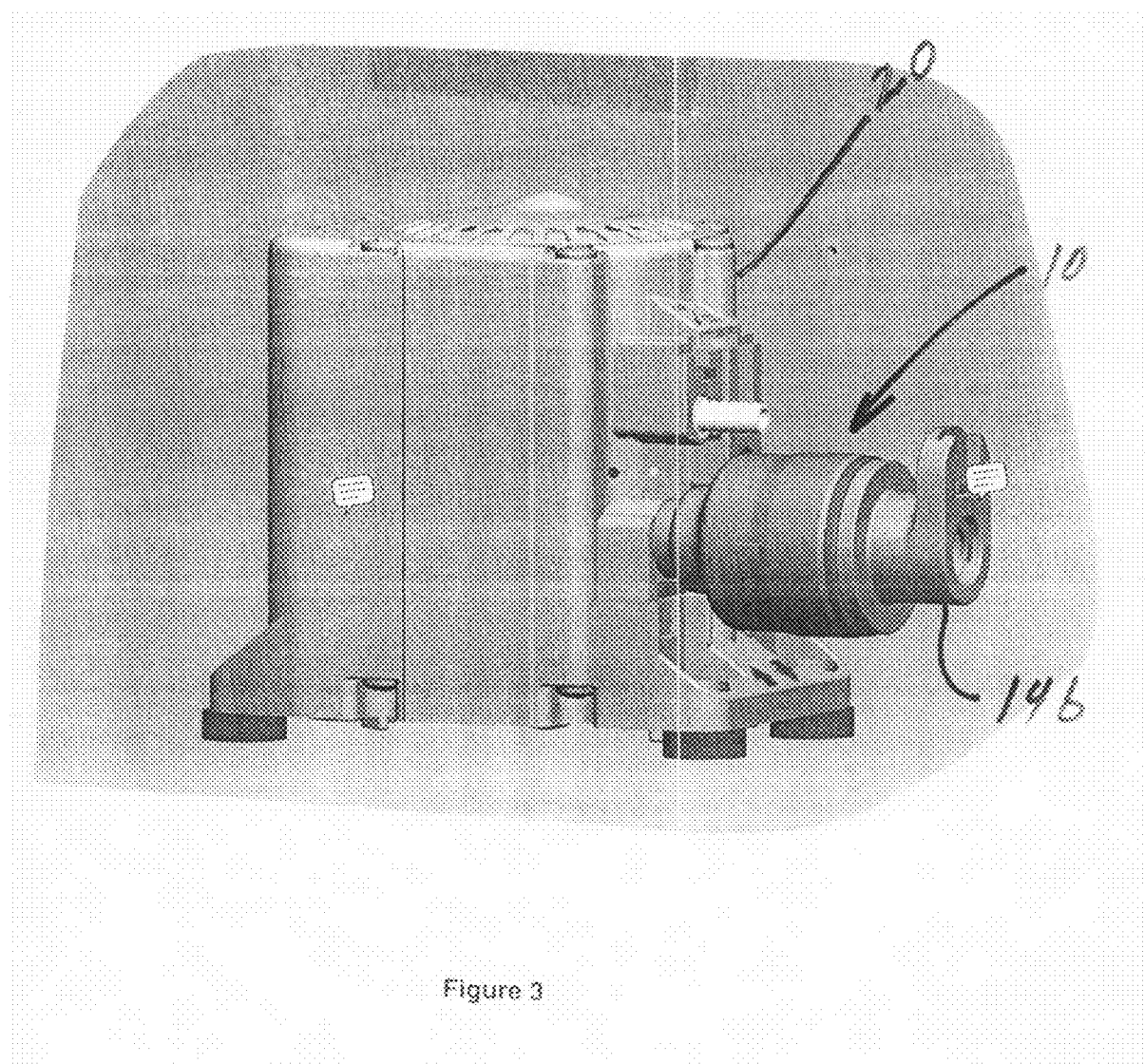
FIG. 3 shows a pressure regulator according t) some embodiments of the present invention coupled to a pump.

The quick-disconnect device 14a (i.e. male) and/or 14b (i.e. female) are respectively arranged on ends 16 or 18 for coupling the body member 12 to a corresponding quick-disconnect device (not shown) that forms part of a device that either provides the fluid or receives the pressure regulated fluid. As shown in FIG. 3 or 4, the device may take the form of a pump for receiving the pressure regulated fluid.

By way of example, the pressure regulator 10 is shown having two quick-disconnect devices 14a, 14b, each quick-disconnect device being arranged on a respective end 16, 18 of the body member 12, although the scope of the invention is not intended to be limited to the use of two quick-disconnect devices. For example, embodiments are envisioned in which the pressure regulator has only one quick-disconnect device on one of the ends.

The quick-disconnect device may take the form of a male quick-disconnect device like element 14a arranged on the port beverage for coupling to a corresponding female quick-disconnect device (not shown) that forms part of a pump 20 (FIG. 3) for receiving the pressure regulated fluid. The quick-disconnect device 14a may include one or more O-rings 19a, 19b, as best shown in FIG. 2c. It was found through experimentation that the use of two O-rings provides effective sealing, especially preventing leakage due to wiggling of the pressure regulator. Moreover, the male end 18 of the body member 12 has an opening with an inner diameter $d_1$ that is dimensioned at about 0.298 inches, and also has four inner ribs, three of which are shown in FIG. 2c as 18a, 18b and 18c, for providing protrusion strength, as shown in FIG. 2c. (The fourth inner rib is not shown in FIG. 2c since it is a cross-sectional view.) The inner ribs strengthen the male end 18 and help to prevent it from breaking off. The scope of the invention is not intended to be limited to the dimension of the opening or the number of inner strengthening ribs, and embodiments are envisioned within the spirit of the invention having a different opening dimension and a different number of inner strengthening ribs.

The quick-disconnect device may also take the form of a female quick-disconnect device like element 14b for coupling to a corresponding male quick-disconnect device that forms part of either a hose 21 or dispenser (not shown) for providing the fluid. The quick-disconnect device 14b may include a locking clip 19c, as best shown in FIG. 2c.

Quick-disconnect devices like element 14a, 14b are known in the art, including the beverage industry. The scope of the invention is not intended to be limited to any particular type or kind thereof either now known or later developed in the future.

As best shown in FIG. 4, the pressure regulator 10 may be dimensioned so as to allow it to be coupled to a pump like element 20 (FIG. 3) arranged on a mounting panel 22 having multiple pumps 20a, 20b, 20c (FIG. 4) and fit or stay within the mounting panel 22 and not protrude out.

The pressure regulator may control water, syrup or beverage flow, although the scope of the invention is not intended to be limited to any particular type or kind of fluid being regulated.

As shown in FIG. 2c, the body member 12 also includes numerous components that form part of an inner regulating portion of the body member 12 and cooperate together to regulate the pressure flow of the fluid, including the following:

Body housing 12a,
Diaphragm 12b,
Spring 12c,
Piston 12d,
O-ring 12e,
0-ring 12f,
Retainer diaphragm 12g,
Housing rear 12h,
Check valve 12i,
Seal ring retainer 12j,
Outer retainer 12k,
Seal ring 12l,
⅛ circular push on ring 12m, and
O-ring 12n.

Figure 1:
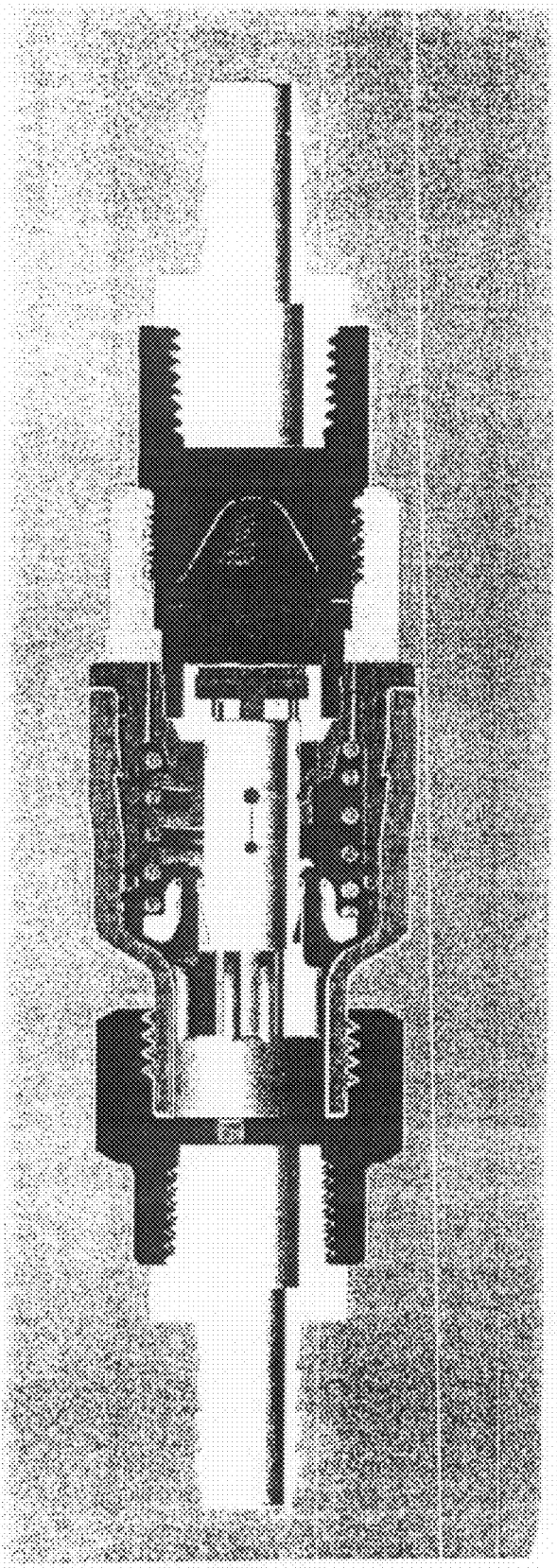
FIG. 1 is a diagram of a pressure regulator that is known in the art.

A person skilled in the art would appreciate how the parts cooperate to provide pressure regulation. Moreover, the inner regulator portion that forms part of the body member of the pressure regulator of the present invention is substantially similar to the inner regulator portion of the body member of the pressure regulator shown in FIG. 1. The whole thrust of the present invention relates to using one or more of the quick-disconnect device 14a, 14b for coupling to the pump like 20 (FIG. 3) on the mounting plate 22 (FIG. 4), which both do not form part of the prior art device shown in FIG. 1.

Figure 5:
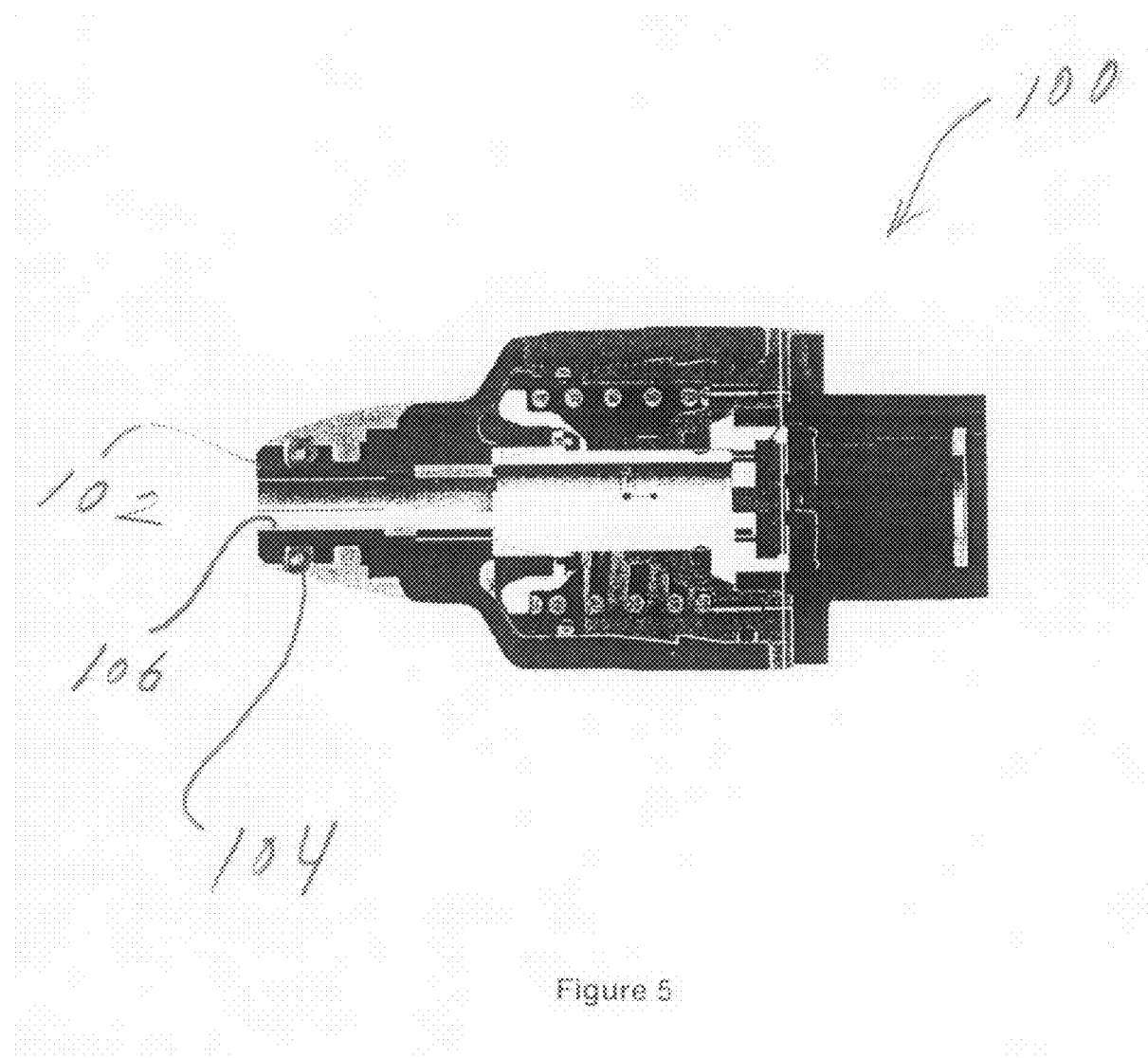
FIG. 5 is a cross-sectional view of another example of a pressure regulator according to some embodiments of the present invention.

FIG. 5 shows an example of an alternative embodiment of the pressure regulator generally indicated as 100 having a quick-disconnect device 102 with one O-ring 104. It was found through experimentation that although one O-ring provides sufficient sealing, the use of two O-rings like that in the embodiment described in relation to FIGS. 1-4 provides better sealing.

The quick-disconnect 102 also has a larger opening 106 than the opening 15 of the pressure regulator 10 in FIG. 2. By way of example, the opening 106 is dimensioned at about 0.320 inches and does not have the inner strengthening ribs like the embodiment in FIGS. 1-4.

The remaining parts of the pressure regulator 100 in FIG. 5 and the pressure regulator in FIG. 1-4 are substantially the same.

Possible Applications

Possible applications include at least the following: Water, soda, or syrup dispenser pumps, as well as water pressure regulators, e.g. in recreational vehicle (RV) and the like.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What we claim is:

1. A pressure regulator and pump combination comprising:
   a pressure regulator having a body member configured to regulate the pressure of a fluid flowing therein, the body member having two ends, one end configured to receive the fluid and another end configured to provide pressure regulated fluid, and having at least one end with a quick-disconnect device;
   a pump having a corresponding quick-disconnect device configured to receive and couple together with the quick-disconnect device of the pressure regulator based at least partly on using a locking clip in order to provide a direct connection between the pressure regulator and pump, eliminating a hose connection between the pump and pressure regulator that would otherwise be left to droop, be prone to breaking, make finding the right connections difficult for a mounted panel of such pumps, and result in undesirable liquid spills;
   either the quick-disconnect device being a male quick-disconnect device and the corresponding quick-disconnect device being a female quick-disconnect device, or the quick-disconnect device being a female quick-disconnect device and the corresponding quick-disconnect device being a male quick disconnect device; and
   the male quick-disconnect device including a male end having an opening with inner strengthening ribs arranged therein that help to prevent the male end from breaking off.

2. A pressure regulator and pump combination according to claim 1, wherein the pressure regulator is dimensioned so as to be coupled to the pump which is arranged on a mounting panel having multiple pumps.

3. A pressure regulator and pump combination according to claim 1, wherein the pump is configured to form part of a plurality of pumps arranged on a mounting panel.

4. A pressure regulator and pump combination according to claim 1, wherein the pressure regulator is configured to control water, syrup or beverage flow.

5. A pressure regulator and pump combination according to claim 1, wherein either the quick-disconnect device or the corresponding quick-connect device comprises at least one O-ring configured to provide effective sealing for substantially preventing leakage due to wiggling of the pressure regulator.

6. A method for coupling a pressure regulator and pump comprising:
   providing a pressure regulator having a body member configured to regulate the pressure of a fluid flowing therein, the body member having two ends, one end configured to receive the fluid and another end configured to provide pressure regulated fluid, and having one end with a quick-disconnect device;
   providing a pump having a corresponding quick-disconnect device configured to receive and couple together with the quick-disconnect device of the pressure regulator; and
   coupling together the quick-disconnect device of the pressure regulator and the corresponding quick-disconnect device of the pump based at least partly on using a locking clip in order to provide a direct connection between the pressure regulator and pump, eliminating a hose connection between the pump and pressure regulator that would otherwise be left to droop, be prone to breaking, make finding the right connections difficult for a mounted panel of such pumps, and result in undesirable liquid spills;
   either the quick-disconnect device being a male quick-disconnect device and the corresponding quick-disconnect device being a female quick-disconnect device, or the quick-disconnect device being a female quick-disconnect device and the corresponding quick-disconnect device being a male quick disconnect device; and
   the male quick-disconnect device including a male end having an opening with inner strengthening ribs arranged therein that help to prevent the male end from breaking off.

7. A method according to claim 6, wherein the pressure regulator is dimensioned so as to be coupled to the pump which is arranged on a mounting panel having multiple pumps.

8. A method according to claim 6, wherein the pump is configured to form part of a plurality of pumps arranged on a mounting panel.

9. A method according to claim 6 wherein the pressure regulator is configured to control water, syrup or beverage flow.

10. A method according to claim 6, wherein either the quick-disconnect device or the corresponding quick-connect device comprises one or more O-rings configured to provide effective sealing for substantially preventing leakage due to wiggling of the pressure regulator.

11. A pressure regulator configured to couple to a pump having a quick-disconnect device that is configured to receive and couple together with a corresponding quick disconnect device, the pressure regulator comprising:
   a body member configured to regulate the pressure of a fluid flowing therein, the body member having two ends, one end configured to receive the fluid and another end configured to provide pressure regulated fluid, and having at least one end with the quick-disconnect device configured to be received and coupled together with the quick-disconnect device of the pump based at least partly on using a locking clip in order to provide a direct connection between the pressure regulator and pump, eliminating a hose connection between the pump and pressure regulator that would otherwise be left to droop, be prone to breaking, make finding the right connections difficult for a mounted panel of such pumps, and result in undesirable liquid spills;

either the quick-disconnect device being a male quick-disconnect device and the corresponding quick-disconnect device being a female quick-disconnect device, or the quick-disconnect device being a female quick-disconnect device and the corresponding quick-disconnect device being a male quick disconnect device; and the male quick-disconnect device including a male end having an opening with inner strengthening ribs arranged therein that help to prevent the male end from breaking off.

12. A pressure regulator according to claim 11, wherein either the quick disconnect device or the corresponding quick-connect device comprises at least one O-ring configured to provide effective sealing for substantially preventing leakage due to wiggling of the pressure regulator.

* * * * *